(12) United States Patent
Cooper et al.

(10) Patent No.: US 11,599,180 B1
(45) Date of Patent: Mar. 7, 2023

(54) BATTERY MANAGEMENT SYSTEMS AND METHODS TO USE THE SAME TO OBTAIN BATTERY SHOCK AND/OR ROLLOVER DATA

(71) Applicant: Green Cubes Technology, LLC, Kokomo, IN (US)

(72) Inventors: Anthony Cooper, Kokomo, IN (US); Vijayendra Jannu, Bangalore (IN); Nagaraj Govindaiah, Banglaore (IN)

(73) Assignee: Green Cubes Technology, LLC, Kokomo, IN (US)

( * ) Notice: Subject to any disclaimer, the term of this patent is extended or adjusted under 35 U.S.C. 154(b) by 228 days.

(21) Appl. No.: 15/875,104

(22) Filed: Jan. 19, 2018

Related U.S. Application Data

(60) Provisional application No. 62/448,154, filed on Jan. 19, 2017.

(51) Int. Cl.
| | |
|---|---|
| *G06F 1/3212* | (2019.01) |
| *G06F 1/26* | (2006.01) |
| *G06F 13/42* | (2006.01) |
| *G06F 13/38* | (2006.01) |
| *G06F 1/3218* | (2019.01) |
| *G06F 1/3234* | (2019.01) |

(52) U.S. Cl.
CPC ............ *G06F 1/3212* (2013.01); *G06F 1/263* (2013.01); *G06F 1/266* (2013.01); *G06F 1/3218* (2013.01); *G06F 1/3243* (2013.01); *G06F 1/3265* (2013.01); *G06F 13/385* (2013.01); *G06F 13/4282* (2013.01); *G06F 2213/0016* (2013.01); *G06F 2213/0042* (2013.01)

(58) Field of Classification Search
CPC ........ G06F 1/26; G06F 1/3206; G06F 1/3212; G06F 1/263; G06F 1/266; G06F 1/3218; G06F 1/3243; G06F 1/3265; G06F 13/385; G06F 13/4282; G06F 2213/0016; G06F 2213/0042
USPC .................................. 713/300, 310; 714/14
See application file for complete search history.

(56) References Cited

U.S. PATENT DOCUMENTS

| | | | | |
|---|---|---|---|---|
| 8,775,847 | B2 * | 7/2014 | Kursula | G06F 1/3275 |
| | | | | 713/340 |
| 9,689,887 | B1 * | 6/2017 | Srinivas | G01B 21/18 |
| 10,153,659 | B2 * | 12/2018 | Yu | H02J 9/061 |
| 2004/0252397 | A1 * | 12/2004 | Hodge | G11B 5/5582 |
| | | | | 360/60 |

(Continued)

*Primary Examiner* — Ji H Bae
(74) *Attorney, Agent, or Firm* — Reichel Stohry Dean LLP; Mark C. Reichel; Natalie J. Dean

(57) ABSTRACT

Battery management systems and methods for using the same to obtain battery shock and/or rollover data. An exemplary battery management system of the present disclosure comprises an accelerometer configured to obtain acceleration data, a microcontroller operably connected to the accelerometer and configured to receive the acceleration data from the accelerometer, and a data storage medium in communication with the microcontroller, the data storage medium configured to store the acceleration data therein, wherein when the battery management system is in communication with a battery, the accelerometer can obtain the acceleration data relating to the battery, and the microcontroller can operate to disconnect the battery from a load connected thereto should the acceleration data meet or exceed a threshold limit.

15 Claims, 4 Drawing Sheets

(56) References Cited

U.S. PATENT DOCUMENTS

| | | | | |
|---|---|---|---|---|
| 2006/0152842 A1* | 7/2006 | Pasolini | ............. | G01P 15/0891 |
| | | | | 360/75 |
| 2007/0107068 A1* | 5/2007 | Kelley | .................. | G01P 15/18 |
| | | | | 726/34 |
| 2007/0120528 A1* | 5/2007 | Burgan | ................ | H02J 7/0029 |
| | | | | 320/114 |
| 2007/0250732 A1* | 10/2007 | Wong | .................. | G06F 1/3203 |
| | | | | 713/324 |
| 2009/0309745 A1* | 12/2009 | Johnson | ................ | G06F 21/81 |
| | | | | 340/635 |
| 2010/0122023 A1* | 5/2010 | Shih | ........................ | G06F 1/30 |
| | | | | 711/104 |
| 2010/0304757 A1* | 12/2010 | Yoshioka | ............. | G06F 1/3246 |
| | | | | 455/456.1 |
| 2015/0327168 A1* | 11/2015 | Yllasjarvi | .............. | G06F 1/325 |
| | | | | 370/311 |
| 2016/0218555 A1* | 7/2016 | Slaby | ................ | H04W 52/0254 |
| 2016/0342297 A1* | 11/2016 | Ellwood | .................. | G06F 3/14 |

* cited by examiner

BATTERY MANAGEMENT SYSTEMS AND METHODS TO USE THE SAME TO OBTAIN BATTERY SHOCK AND/OR ROLLOVER DATA

PRIORITY

The present application is related to, and claims the priority benefit of, U.S. Provisional Patent Application Ser. No. 62/448,154, filed Jan. 19, 2017, the contents of which are incorporated herein directly and by reference in their entirety.

BACKGROUND

Large battery systems are used in environments where high shock levels can be dangerous to the battery operation. In addition, due to the heavy weight of certain battery systems, they can be mishandled/dropped during transportation which can render the battery unsafe for usage. During handling the batteries may be rolled over which can also damage the internal components of the battery making them unsafe for operation. The issues are compounded with the high energy potential of lithium battery systems.

Current mechanisms to detect shock or rollover include the use of rollover or shock gauges attached to the exterior surface of the battery or its housing for visible notification. However, these gauges cannot not prevent usage of the battery, and they require visual inspection to determine if the battery had been damaged. Said gauges also do not collect data over time to determine if improper operational environment for the battery was being utilized unsafely.

In view of the foregoing, a system for determining the extent of shock and/or rollover of a battery that can not only store said data to be accessed in the future, but also configured to disable said potentially damaged or dangerous battery, would be well received in the marketplace.

BRIEF SUMMARY

The present disclosure includes disclosure of a battery management system, comprising an accelerometer configured to obtain acceleration data; a microcontroller operably connected to the accelerometer and configured to receive the acceleration data from the accelerometer; and a data storage medium in communication with the microcontroller, the data storage medium configured to store the acceleration data therein; wherein when the battery management system is in communication with a battery, the battery management system can obtain the acceleration data relating to the battery and disconnect the battery from a load connected thereto should the acceleration data meet or exceed a threshold limit.

The present disclosure includes disclosure of a battery management system, wherein the accelerometer data is indicative of g forces experienced by the battery.

The present disclosure includes disclosure of a battery management system, wherein the accelerometer data is indicative of a degree of rollover or tilt experienced by the battery.

The present disclosure includes disclosure of a battery management system, configured to be connected to a computer, whereby the acceleration data from the data storage medium can be transferred from the battery management system to the computer.

The present disclosure includes disclosure of a battery management system, comprising an accelerometer configured to obtain acceleration data; a microcontroller operably connected to the accelerometer and configured to receive the acceleration data from the accelerometer; and a data storage medium in communication with the microcontroller, the data storage medium configured to store the acceleration data therein; wherein when the battery management system is in communication with a battery, the accelerometer can obtain the acceleration data relating to the battery, and the microcontroller can operate to disconnect the battery from a load connected thereto should the acceleration data meet or exceed a threshold limit.

The present disclosure includes disclosure of a battery management system, wherein the accelerometer data is indicative of g forces experienced by the battery.

The present disclosure includes disclosure of a battery management system, wherein the accelerometer data is indicative of a degree of rollover or tilt experienced by the battery.

The present disclosure includes disclosure of a battery management system, configured for connection to a computer, whereby the acceleration data from the data storage medium can be transferred from the battery management system to the computer and accessed by the computer.

The present disclosure includes disclosure of a battery management system, further comprising the battery in communication with the microcontroller.

The present disclosure includes disclosure of a battery management system, wherein the data storage medium comprises flash memory.

The present disclosure includes disclosure of a battery management system, wherein the acceleration data is indicative of three-axis information, and wherein the microcontroller can operate to disconnect the battery from a load connected thereto should the acceleration data of at least one axis of the three-axis information meet or exceed a threshold limit.

The present disclosure includes disclosure of a battery management system, wherein the acceleration data is indicative of a free fall of the battery, and wherein the microcontroller can operate to disconnect the battery from a load connected thereto due to the indication of the free fall of the battery.

The present disclosure includes disclosure of a battery management system, wherein the battery is connected to the load using a switch, and wherein the microcontroller is configured to operate the switch to disconnect the battery from the load.

The present disclosure includes disclosure of a battery management system, further comprising a display in communication with the microcontroller, the display configured to display the acceleration data.

The present disclosure includes disclosure of a battery management system, further comprising a power supply connected to the microcontroller, configured to provide power to the microcontroller.

The present disclosure includes disclosure of a battery management system, comprising an accelerometer configured to obtain acceleration data; a microcontroller operably connected to the accelerometer and configured to receive the acceleration data from the accelerometer; a data storage medium in communication with the microcontroller, the data storage medium configured to store the acceleration data therein; a display in communication with the microcontroller, the display configured to display the acceleration data; and a power supply connected to the microcontroller, configured to provide power to the microcontroller; wherein when the battery management system is in communication with a battery, the accelerometer can obtain the acceleration data relating to the battery, and the microcontroller can operate to disconnect the battery from a load connected thereto should the acceleration data meet or exceed a threshold limit.

The present disclosure includes disclosure of a battery management system, wherein the acceleration data is indicative of three-axis information, and wherein the microcontroller can operate to disconnect the battery from a load connected thereto should the acceleration data of at least one axis of the three-axis information meet or exceed a threshold limit.

The present disclosure includes disclosure of a battery management system, wherein the battery is connected to the load using a switch, and wherein the microcontroller is configured to operate the switch to disconnect the battery from the load.

The present disclosure includes disclosure of a method of using a battery management system, comprising positioning a battery management system in communication with a battery connected to a load, the battery management system comprising an accelerometer configured to obtain acceleration data from the battery; a microcontroller operably connected to the accelerometer and configured to receive the acceleration data from the accelerometer; and a data storage medium in communication with the microcontroller, the data storage medium configured to store the acceleration data therein; and operating the accelerometer to obtain the acceleration data and operating the microcontroller to receive the acceleration data from the accelerometer.

The present disclosure includes disclosure of a method of using a battery management system, further comprising the step of operating the microcontroller to disconnect the battery from the load due to the acceleration data meeting or exceeding a threshold limit.

The present disclosure includes disclosure of a method of using a battery management system, further comprising the step of operating the microcontroller to reconnect the battery to the load.

The present disclosure includes disclosure of a method of using a battery management system, wherein the acceleration data comprises a detected amount of gravitational force experienced by the battery.

The present disclosure includes disclosure of a method of using a battery management system, wherein the acceleration data comprises a detected degree of tilt or rollover experienced by the battery.

The present disclosure includes disclosure of a method of using a battery management system, wherein the acceleration data includes data relating to a number of instances that the battery meets or exceeds a threshold limit of acceleration.

BRIEF DESCRIPTION OF THE DRAWINGS

The disclosed embodiments and other features, advantages, and disclosures contained herein, and the matter of attaining them, will become apparent and the present disclosure will be better understood by reference to the following description of various exemplary embodiments of the present disclosure taken in conjunction with the accompanying drawings, wherein.

Figure 1:
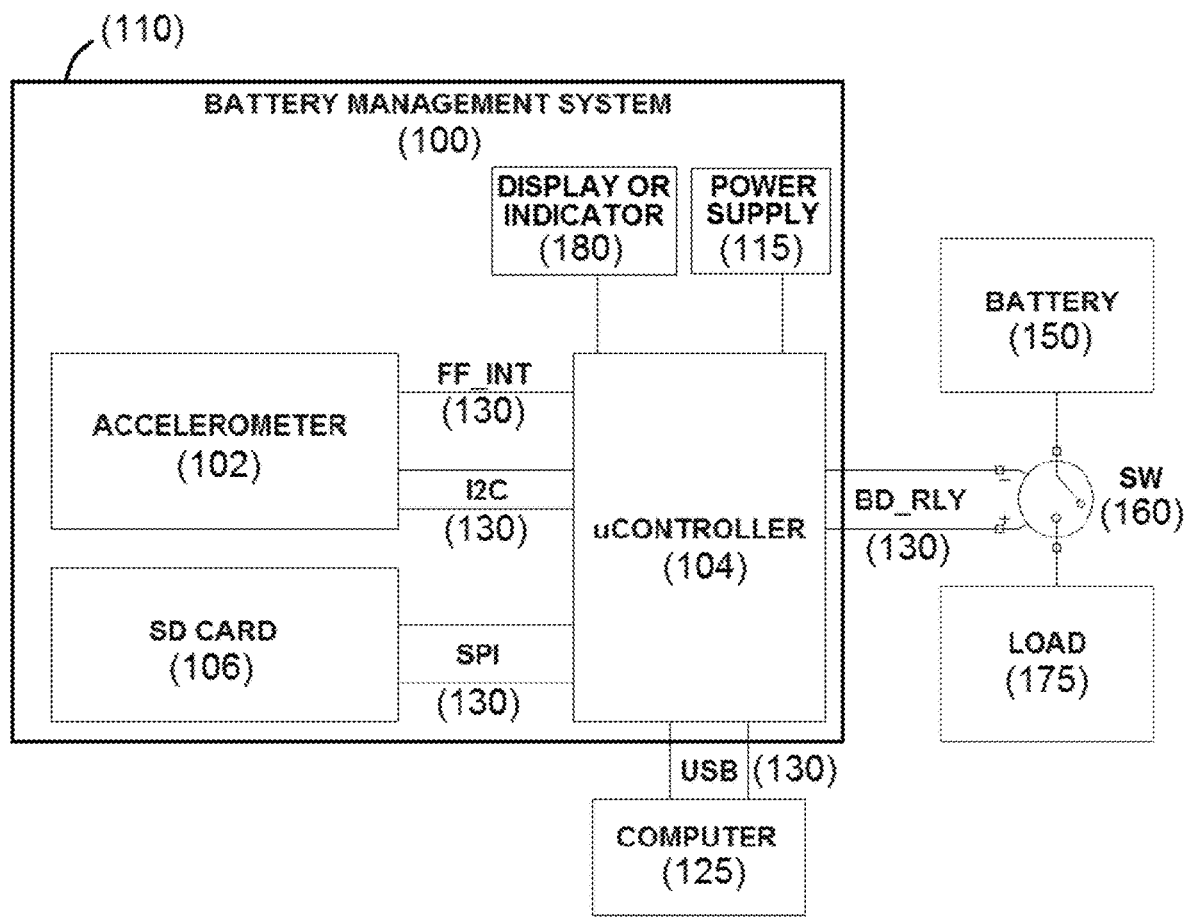
FIG. 1 shows a block component diagram of a battery management system connected to a battery, according to an exemplary embodiment of the present disclosure.

As such, an overview of the features, functions and/or configurations of the components depicted in the various figures will now be presented. It should be appreciated that not all of the features of the components of the figures are necessarily described and some of these non-discussed features (as well as discussed features) are inherent from the figures themselves. Other non-discussed features may be inherent in component geometry and/or configuration. Furthermore, wherever feasible and convenient, like reference numerals are used in the figures and the description to refer to the same or like parts or steps. The figures are in a simplified form and not to precise scale.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Exemplary battery management systems 100 of the present disclosure, such as shown in FIG. 1, comprise an accelerometer 102 configured to monitor a physical environment of a battery 150 in communication therewith. Accelerometer 102 is in communication with (directly or indirectly coupled to) a microcontroller 104 (namely a processor or microprocessor), configured to monitor the battery environment for various shock levels or acceleration, as determined by accelerometer 102, which can indicate that battery 150 may have been mishandled, such as being dropped and/or rolled over.

Microcontroller 104 can use acceleration data obtained from accelerometer 102 to determine if improper operation or handling of battery 150 has occurred. Should the acceleration data levels exceed an established safety threshold, battery management system 100 can provide error conditions/information to a user of battery management system 100 via one or more messages/indications, as referenced in further detail herein.

Battery management systems 100, in various embodiments, further comprise a data storage medium 106, such as flash memory. Exemplary data storage media 106 of the present disclosure may include, but are not limited to, universal serial bus (USB) drives ("thumb" drives), secure digital (SD) cards, SD high capacity (SDHC) cards, SD extended capacity (SDXC) cards, miniSD cards, microSD cards, compact flash (CF) cards, XQD cards, non-volatile flash memory, electrically erasable programmable read-only memory (EEPROMS), and the like.

In the event microcontroller 104 determines that battery management system 100 has been mishandled, battery management system 100 will shut down the power output of battery 150 to prevent unsafe operations.

Microcontroller 104 is configured to continuously read the three-axis (x, y, and z axis) g force information from accelerometer 102, and is configured to transmit said accelerometer data to data storage medium 106, such as a SD card. In at least some battery management system 100 embodiments, microcontroller 104 is also configured to transmit said accelerometer data to an external computer 125, such as via USB, a cabled connection, controller area network (CAN) bus (including serial messages), wirelessly (through wi-fi, IEEE 802.11, Bluetooth, and the like), etc., whereby microcontroller 104 can be connected directly or indirectly to computer 125 to transmit said data. Data storage medium 106 can also be removed from battery management system 100 and connected directly or indirectly to computer 125, as may be desired. It is noted that a computer 125 is not required in order for a battery management system 100 of the present disclosure to operate as desired.

Accelerometers 102 of the present disclosure are also configured to generate interrupts for a free fall detection, such as when one or more respective axis g values exceed a configured threshold limit. When microcontroller 104 senses the interrupt, it can operate to disconnect the load from the battery 150. Microcontrollers 104 can also analyze and check the accelerometer data against pre-defined shock and rollover thresholds, and log the status and/or number of occurrences in data storage medium 106.

FIG. 1 shows an exemplary battery management system 100 of the present disclosure and how various components thereof couple to and/or otherwise communicate with other portions of battery management system 100 and an exemplary battery 150. For example, and as shown therein, an exemplary battery management system 100 comprises an accelerometer 102 coupled to or otherwise in communication with a microcontroller 104. Microcontroller 104 is also coupled to or otherwise in communication with a data storage medium 106, such as a SD card or other data storage medium 106. Battery management system 100 is configured to be coupled to a battery 150, such as shown in FIG. 1, so to control whether or not battery 150 is effectively connected to a load 175, such as, for example, by way of controlling operation of a switch 160 effectively coupled to battery 150 and load 175. For example, and should microcontroller 104 instruct switch 160 (or otherwise permit switch 160) to be or remain closed, battery 150 would be effectively connected to load 175 so to provide power to load 175 so that load 175 can at least partially operate from power from battery 150. Should microcontroller 104 instruct switch 160 (or otherwise permit switch 160) to be or remain open, battery 150 would be effectively disconnected from load 175 so that power from battery 150 is not provided to load 175. As shown in FIG. 1, various components of battery management system 100 can be connected to or otherwise be in communication with other components of battery management system 100 and/or external components, such as computer 125, battery 150, switch 160, etc., via one or more connection/communication mechanisms, such as inter-integrated circuits (I2Cs), serial peripheral interfaces (SPIs), board relays (BD-RLYs), USB connectors, etc. Said connection/communication mechanisms are referred to herein as connections 130, and can be unidirectional, such as by way of accelerometer 102 transmitting acceleration data to microcontroller 104 (or microcontroller 104 receiving transmission data from accelerometer 102), or bidirectional, such as microcontroller 104 providing information/data to computer 125 or data storage medium 106 and computer 125 or data storage medium 106 providing information/data to microcontroller 104. Software, namely computer instructions executable by microcontroller 104, could be stored on data storage medium 106 or at another location, and can contain the various instructions/parameters in connection with the determination as to whether or not to connect and/or disconnect battery 150 from load 175, whether or not to operate switch 160, whether or not to save accelerometer data from accelerometer 102 within data storage medium 106 or computer 125, and the like, in connection with operation of microcontroller 104 as referenced herein.

Figure 2:
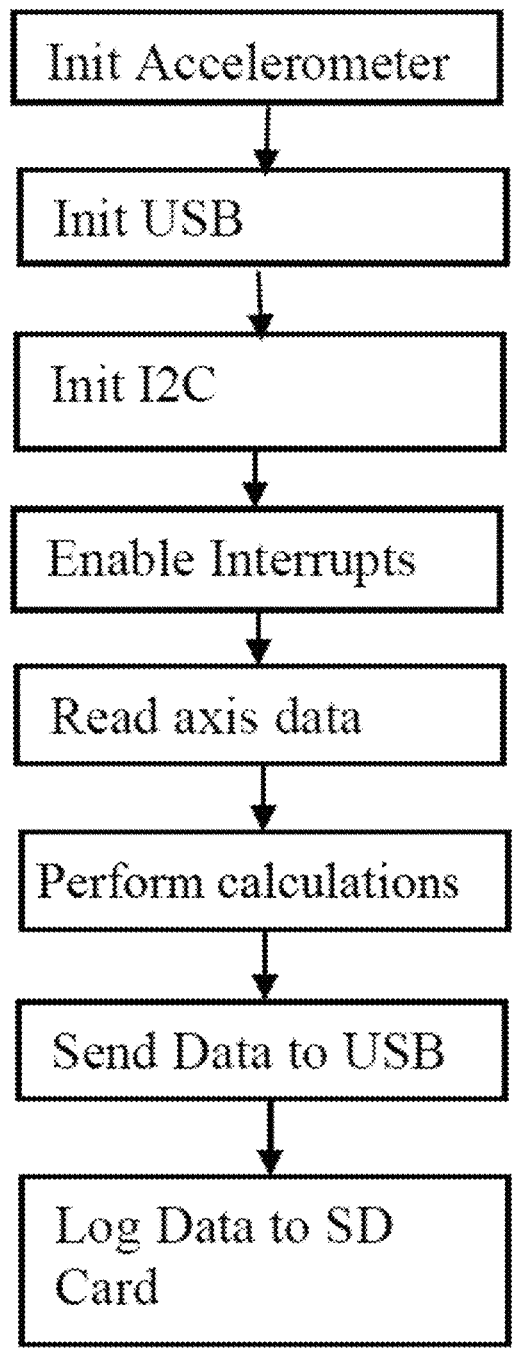
FIG. 2 shows a flowchart of steps relating to obtaining accelerometer data, according to an exemplary embodiment of the present disclosure.

FIG. 2 depicts steps of an exemplary flowchart depicting exemplary steps of operation of components of an exemplary battery management system 100 of the present disclosure relating to the process of logging axis parameters (obtaining accelerometer data from accelerometer 102 and storing the same in data storage medium 106). As shown therein, various components of battery management system 100 could be initialized, such as accelerometer 102, microcontroller 104, various connectors/circuits, etc. (such as, for example, the USB connection, the I2Cs, etc., referenced in FIG. 2), so that accelerometer 102 is active/operational and able to obtain accelerometer data, and so that microcontroller 104 is active/operational and able to obtain accelerometer data from accelerometer 102, direct storage of said data in data storage medium 106, direct opening and/or closing of switch 160, and/or direct transmission of said data to computer 125. Accelerometer data can be obtained at various time intervals as may be desired, and said data can be stored within data storage medium 106 and/or transferred to computer 125 at intervals as may be desired. In addition, calculations can be performed using microcontroller 104, based upon the acceleration data obtained from accelerometer 102, to determine a potential extent, degree, or level of tilt, shock, and/or rollover of battery 150, whereby said calculations generate calculated acceleration data that can also be stored in data storage medium and be used by microcontroller 104 to determine whether or not battery 150 should be or remain connected to load 175.

As referenced herein, accelerometer 102 is configured to obtain accelerometer data in connection with a handling status of battery 150. For example, accelerometers 102, in various embodiments, are configured to determine whether or not a battery 150 has been tilted (and to what degree of tilt), experienced shock (a force against battery 150) and to what extent/degree, rolled over, and/or whether or not battery 150 has fallen, which can be determined based on potential forces/impacts and/or acceleration data, in various axes (x-, y-, and/or z-, as referenced herein), such that potential crash or other damage (including vibration damage) can be identified/determined. Said data can be obtained during transport of battery 150 and/or during use of battery 150, such as when battery 150 is connected to a load 175, and can be used to determine if battery 150 has been mishandled, inappropriately/improperly transported, damaged, etc., so that use of battery 150 can be discontinued if necessary. For example, accelerometer 102 can obtain acceleration data during transport (such as by use of a fork truck or other transport mechanism) and/or during use, as referenced herein. Said acceleration data could identify potential future concerns with battery 150, such as prolonged vibration, shock, etc., so that battery 150 can be disconnected from load 175 prior to battery 150 becoming potentially dangerous to use.

Figure 3:
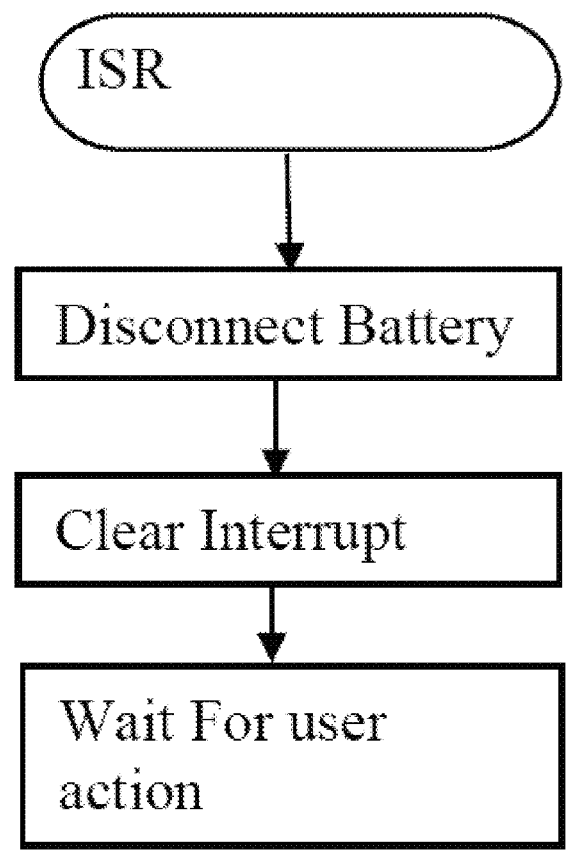
FIG. 3 shows a flowchart of steps relating to disconnecting a battery from a load based on accelerometer data, according to an exemplary embodiment of the present disclosure.

FIG. 3 depicts steps of an exemplary flowchart depicting exemplary steps of operation of components of an exemplary battery management system 100 of the present disclosure relating to free fall detection. Should battery 150 experience a level of tilt and/or shock exceeding levels set within battery management system 100 (whereby said levels are generally related to safe operation of battery 150, and when said levels are met and/or exceeded, battery 150 may no longer be safely operational), microcontroller 104 can instruct switch 160 to open or otherwise cause battery 150 to effectively be disconnected form load 175. Data relating to said instruction can be stored in data storage medium 106 and/or ultimately transmitted to computer 125. A user/operator, upon receipt of said instruction data (causing battery 150 to be effectively disconnected from load 175), can then decide whether or not to reconnect battery 150 to load 175. Said data can also serve as a warning to a user/operator of battery 150 that battery 150 may have been compromised due to shock and/or rollover and that battery 150 may therefore be unsafe for use. In various embodiments of battery management systems 100 of the present disclosure comprising a display or indicator 180 configured to display or indicate a status of battery connectivity, such as a display screen, one or more lights, etc., said display or indicator 180 could display or indicate an operative status of battery 150 (such that a load 175 is operatively connected to battery 150, such as when switch 160 is closed) and/or a disconnected status of battery 150 (such that load 175 is no longer operatively connected to battery 150, such as when switch 160 is open). Display or indicator 180 would be operatively connected to at least one component of battery management system 100, such as, for example, accelerometer 102, microcontroller 104, and/or storage medium 106.

Figure 4:
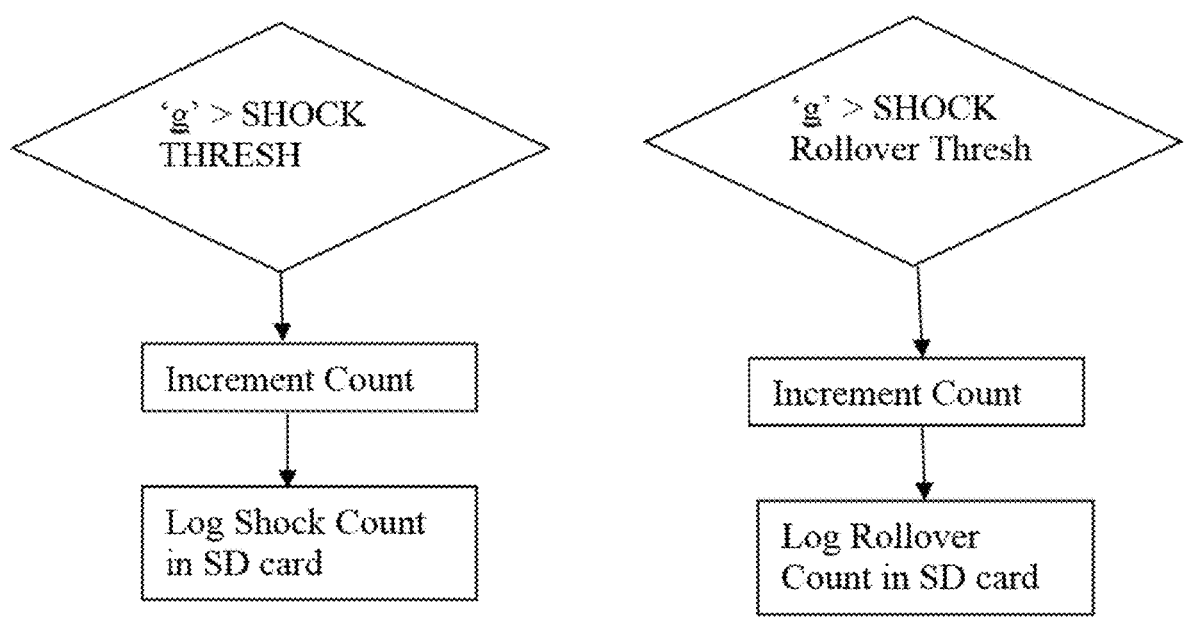
FIG. 4 shows a flowchart of steps relating to obtaining and storing accelerometer data, according to an exemplary embodiment of the present disclosure.

FIG. 4 depicts steps of an exemplary flowchart depicting exemplary steps of operation of components of an exemplary battery management system 100 of the present disclosure as relating to shock thresholds and rollover thresholds and logging data relating to the same. For example, a shock threshold may be a detected amount of gravitational force experienced by battery 150, and a rollover threshold may be a detected degree of tilt or rollover experienced by battery 150. As shown therein, exemplary battery management systems 100 of the present disclosure are configured to not only obtain data relating to whether or not a threshold amount of shock (left side of FIG. 4) and/or rollover (right side of FIG. 4) of battery 150 has been met or exceeded, but also how many times the threshold has been met or exceeded. The number of times (and associated date, time, and or extent of shock or degree of rollover) can be obtained by accelerometer 102 and stored within data storage medium 106 as desired, whereby said data can be stored within data storage medium 106 at the direction of microcontroller 104 and retrieved from data storage medium 106 at the direction of microcontroller 104, as may be desired.

The present disclosure also includes disclosure of relating accelerometer data obtained from accelerometer 102 to a warranty or guarantee of battery 150. For example, a battery 150 could have a warranty or guarantee that is based on proper use and would be voided if the battery 150 was mishandled. A battery management system 100 of the present disclosure can be used to monitor levels of shock and/or rollover (tilt and the degree of the same) using accelerometer 102, and should accelerometer 102 detect high and or repeated levels of shock and/or rollover, that acceleration data can be the basis of voiding a warranty of guarantee of the battery 150 being monitored by battery management system 100.

Battery management systems 100 of the present disclosure can be enclosed within a housing 110, such as shown in FIG. 1, whereby various components of battery management systems 100 can be enclosed therein as may be desired. Various components of battery management systems 100, such as accelerometer 102, microcontroller 104, and/or storage medium 106 can be powered by a power supply 115 (such as a battery) connected thereto, such as shown in FIG. 1, and/or powered by a battery 150 connected thereto that is being monitored by said battery management system 100.

While various embodiments of battery management systems and methods for using the same to obtain battery shock and/or rollover data have been described in considerable detail herein, the embodiments are merely offered as non-limiting examples of the disclosure described herein. It will therefore be understood that various changes and modifications may be made, and equivalents may be substituted for elements thereof, without departing from the scope of the present disclosure. The present disclosure is not intended to be exhaustive or limiting with respect to the content thereof.

Further, in describing representative embodiments, the present disclosure may have presented a method and/or a process as a particular sequence of steps. However, to the extent that the method or process does not rely on the particular order of steps set forth therein, the method or process should not be limited to the particular sequence of steps described, as other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A battery management system, comprising:
   an accelerometer configured to obtain acceleration data, wherein the acceleration data is used to calculate a degree of tilt or shock experienced by a battery;
   a microcontroller operably connected to the accelerometer and configured to receive the acceleration data from the accelerometer; and
   a data storage medium in communication with the microcontroller, the data storage medium configured to store the acceleration data therein;
   wherein when the battery management system is in communication with the battery, the accelerometer obtains the acceleration data relating to the battery; and
   wherein when the acceleration data indicates the degree of tilt or shock of the battery meets or exceeds a threshold limit of degree of tilt or shock, the microcontroller operates to disconnect the battery from a load and logs the acceleration data, a status, the degree of tilt or shock, and a number of instances meeting or exceeding said threshold limit of degree of tilt or shock in the data storage medium.

2. The battery management system of claim 1, wherein the acceleration data is indicative of g forces experienced by the battery.

3. The battery management system of claim 1, configured for connection to a computer, whereby the acceleration data from the data storage medium can be transferred from the battery management system to the computer and accessed by the computer.

4. The battery management system of claim 1, further comprising:
   the battery in communication with the microcontroller.

5. The battery management system of claim 1, wherein the data storage medium comprises flash memory.

6. The battery management system of claim 1, wherein the acceleration data is indicative of a free fall of the battery, and wherein the microcontroller can operate to disconnect the battery from a load connected thereto due to the indication of the free fall of the battery.

7. The battery management system of claim 4, wherein the battery is connected to the load using a switch, and wherein the microcontroller is configured to operate the switch to disconnect the battery from the load.

8. The battery management system of claim 1, further comprising:
   a display in communication with the microcontroller, the display configured to display the acceleration data.

9. The battery management system of claim 1, further comprising:
   a power supply connected to the microcontroller, configured to provide power to the microcontroller.

10. A battery management system, comprising:
    an accelerometer configured to obtain acceleration data, wherein the acceleration data is indicative of a degree of tilt or shock of a battery connected to a load;
    a microcontroller operably connected to the accelerometer and configured to receive the acceleration data from the accelerometer;
    a data storage medium in communication with the microcontroller, the data storage medium configured to store the acceleration data therein;
    a display in communication with the microcontroller, the display configured to display the acceleration data; and
    a power supply connected to the microcontroller, configured to provide power to the microcontroller;
    wherein the accelerometer obtains the acceleration data, and the acceleration data is used to determine if battery use should be discontinued;
    wherein when the battery management system is in communication with the battery, the accelerometer obtains the acceleration data relating to the battery; and
    whereupon the microcontroller operates to disconnect the battery from the load should the acceleration data indicate the degree of tilt or shock of the battery meets or exceeds a threshold limit of degree of tilt or shock of the battery and the microcontroller logs the acceleration data, a status, and a number of instances meeting or exceeding said threshold limit in the data storage medium.

11. The battery management system of claim 10, wherein the battery is connected to the load using a switch, and wherein the microcontroller is configured to operate the switch to disconnect the battery from the load.

12. A method of using a battery management system, comprising:
    positioning a battery management system in communication with a battery connected to a load, the battery management system comprising:
       an accelerometer configured to obtain acceleration data from the battery, wherein the acceleration data is indicative of a degree of tilt or shock of a battery;
       a microcontroller operably connected to the accelerometer and configured to receive the acceleration data from the accelerometer; and
       a data storage medium in communication with the microcontroller, the data storage medium configured to store the acceleration data therein;
    operating the accelerometer to obtain the acceleration data and operating the microcontroller to receive the acceleration data from the accelerometer;
    generating calculated acceleration data by calculating the degree of tilt or shock experienced by the battery based upon the acceleration data;
    using the calculated acceleration data to determine the battery should not be connected to the load;
    operating the microcontroller to disconnect the battery from the load; and
    checking the acceleration data against tilt or shock threshold limits and logging the acceleration data, a status, and a number of occurrences where the acceleration data meets or exceeds the tilt or shock threshold limits in the data storage medium.

13. The method of claim 12, further comprising the step of:
    operating the microcontroller to reconnect the battery to the load.

14. The method of claim 12, wherein the acceleration data comprises a detected amount of gravitational force experienced by the battery.

15. The method of claim 12, wherein the acceleration data includes data relating to a number of instances that the battery meets or exceeds a threshold limit of acceleration.

* * * * *